(12) United States Patent
Zavesky et al.

(10) Patent No.: US 10,715,987 B2
(45) Date of Patent: Jul. 14, 2020

(54) DYNAMIC DERIVATION OF AND BROADCAST TO EMERGENCY CONTACT LIST

(71) Applicant: AT&T Intellectual Property I, L.P., Atlanta, GA (US)

(72) Inventors: Eric Zavesky, Austin, TX (US); Christopher Volinsky, Morristown, NJ (US); James Klosowski, Ridgefield, CT (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/145,442

(22) Filed: Sep. 28, 2018

(65) Prior Publication Data

US 2020/0107176 A1    Apr. 2, 2020

(51) Int. Cl.
*H04W 4/90* (2018.01)
*H04W 4/02* (2018.01)
*H04W 4/08* (2009.01)

(52) U.S. Cl.
CPC .............. *H04W 4/90* (2018.02); *H04W 4/02* (2013.01); *H04W 4/08* (2013.01)

(58) Field of Classification Search
CPC ........... H04W 4/02; H04W 4/90; H04W 4/21; H04W 4/023; H04W 4/08; H04W 76/50
See application file for complete search history.

(56) References Cited

U.S. PATENT DOCUMENTS

| | | | |
|---|---|---|---|
| 8,509,732 B1* | 8/2013 | Venkatraman | H04M 11/04 455/404.2 |
| 9,014,656 B2 | 4/2015 | Courtney | |
| 9,014,657 B2 | 4/2015 | Rohde et al. | |
| 9,467,834 B2 | 10/2016 | Guday et al. | |
| 9,503,873 B1 | 11/2016 | Yadav | |
| 9,817,948 B2 | 11/2017 | Swank | |
| 9,980,119 B2 | 5/2018 | Grube | |
| 2006/0178128 A1 | 8/2006 | Eaton et al. | |
| 2010/0190467 A1* | 7/2010 | Scott | H04M 1/2745 455/404.2 |
| 2010/0289644 A1* | 11/2010 | Slavin | G08B 13/2402 340/568.1 |
| 2010/0330972 A1* | 12/2010 | Angiolillo | H04M 1/2746 455/418 |
| 2011/0092227 A1* | 4/2011 | Phukan | H04M 1/72572 455/456.3 |
| 2012/0282887 A1 | 11/2012 | Khoo et al. | |
| 2013/0109342 A1* | 5/2013 | Welch | B60N 2/002 455/404.2 |
| 2013/0203397 A1* | 8/2013 | Vidal | H04M 1/72519 455/418 |
| 2015/0317893 A1* | 11/2015 | Tseng | H04M 1/72522 340/686.1 |
| 2017/0180540 A1 | 6/2017 | Shaw et al. | |
| 2018/0146354 A1* | 5/2018 | Patel | H04W 4/90 |
| 2018/0176362 A1 | 6/2018 | Cohen | |
| 2019/0020991 A1* | 1/2019 | Hamilton | H04W 88/06 |

* cited by examiner

*Primary Examiner* — Dung Hong
(74) *Attorney, Agent, or Firm* — BakerHostetler (57) ABSTRACT

A system for dynamic derivation of and sending to a contact group. The system may recognize an emergency situation (natural disaster, stranded, lost cell connection) and send a confirmation that may be sent to different contact groups from a network entity.

18 Claims, 7 Drawing Sheets

DYNAMIC DERIVATION OF AND BROADCAST TO EMERGENCY CONTACT LIST

TECHNICAL FIELD

The technical field generally relates to communications and, more specifically, to systems and methods for dynamic derivation of a contact group, such as an emergency contact list.

BACKGROUND

Emergencies create confusion and frustration at both personal and infrastructure levels. The ability for individuals in an emergency zone to reach out to their friends and family is among the highest priority after an event. Unfortunately, damage to infrastructure during an event often limits overall mobile connectivity or limits capacity such that the network is overloaded with the abundance of simultaneous connection requests. Additionally, when an individual is trying to reach out and confirm or request their "ok" status, the problem is exacerbated when trying to contact all of the tens or hundreds of individuals in her or his community of interest.

SUMMARY

Disclosed herein is a system for dynamic derivation of and sending to a contact group. For example, with contact information, the system further assists a user in an emergency situation (natural disaster, stranded, lost cell connection) to send a single confirmation that can be sent to different contact groups. Disclosed herein are (1) dynamically formulated contact group; (2) intelligent ok message solicitation (e.g., polling); and (3) a central service to send (e.g., broadcast) a prioritized message, among other things.

In an example, an apparatus may include a processor and a memory coupled with the processor that effectuates operations. The operations may include obtaining first information associated with a user of a mobile device, the first information comprising a geographic location of the mobile device; based on the first information, generating a contact group, wherein the contact group comprises a subset of contacts of the user based on second information, wherein the second information comprises geographic location of contacts of the user; detecting an event; and based on the detected event, sending a message to the contact group. The first information or second information may include a time, weather alert, frequency of inbound or outbound communication of the mobile device, electronic mail address, phone number, or the like. The apparatus may be a server, the mobile device, or another mobile device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Disclosed herein is a system for dynamic derivation of and sending to a contact group. The system may recognize a situation (natural disaster, stranded, lost cell connection) and send a confirmation that may be sent to different contacts of a contact group without having a user to individually create a message for each contact. Disclosed herein are (1) dynamically formulated contact group; (2) intelligent ok message solicitation (e.g., polling); and (3) a central service to send (e.g., broadcast) a prioritized message, among other things.

Contact groups may be derived automatically by co-location, action, call records, messaging, etc. This may significantly reduce the stagnancy of the list and reduces the burden of continuous user-initiated updates. Information such as recency of activity of calls or texts as well as location may be used to create a contact group and make sure the "right" person(s) is notified. With regard to intelligent ok message solicitation for individuals, a central service may provide both push (user-initiated) and pull (user-polled) mechanisms for creating an okay message that can be sent to a contact group based on priority, location, or other information. In an example, if a user is in an emergency situation, a person (e.g., park ranger) may use the dynamically created contact group to "poll" the contact group to determine if the user is okay. With regard to a central service, it may allow a resending of a prioritized message to a wide diversity of contacts via one or more simple contact mechanisms; depending on the priority of the message, in which the priority may be from the user or the contextual evidence of the emergency, different contact group or civic institutions (e.g., public safety) may be contacted.

Figure 1:
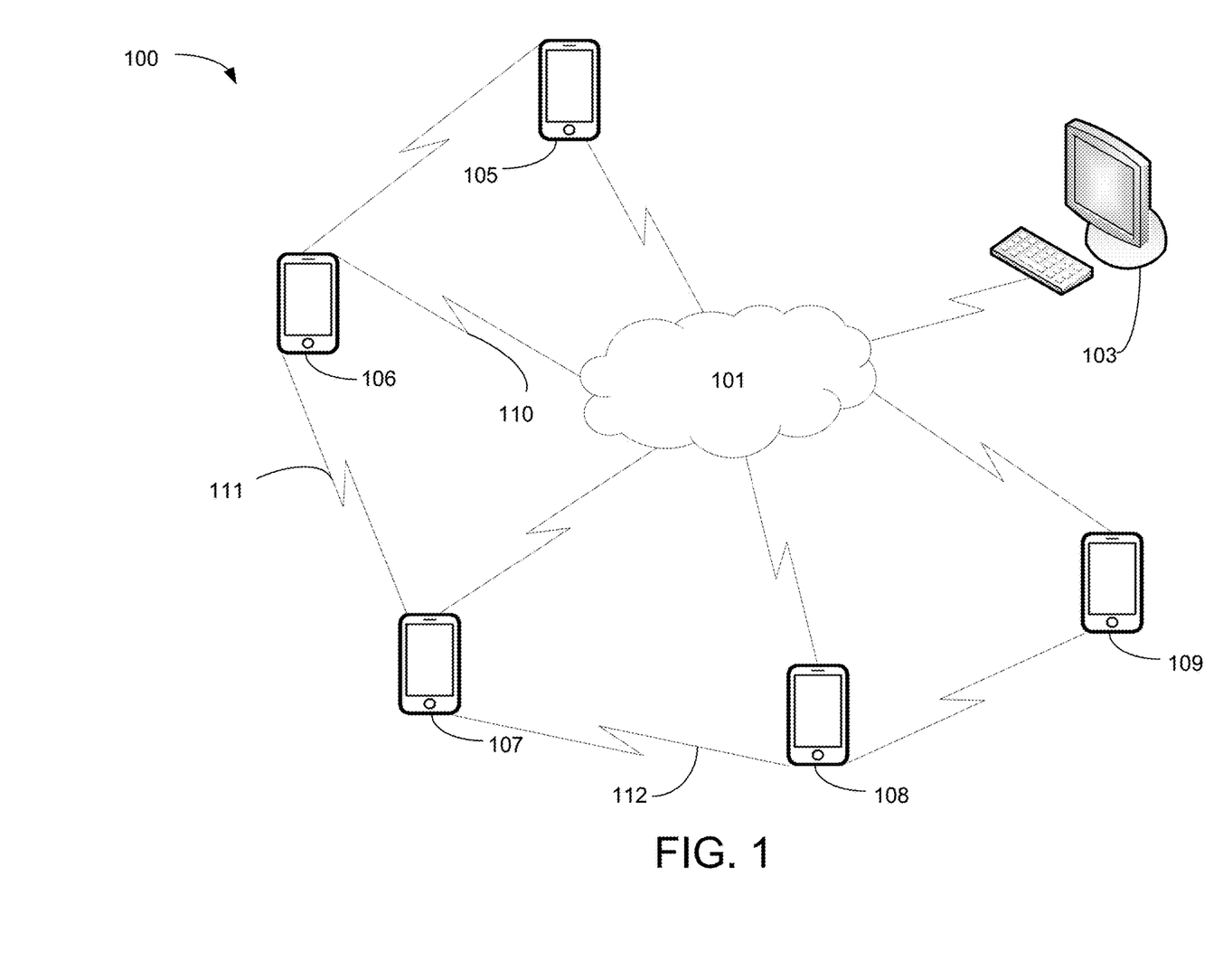
FIG. 1 illustrates an exemplary system that may implement dynamic derivation of and sending to a contact group.

FIG. 1 illustrates an exemplary system that may implement dynamic derivation of and sending to a contact group, as disclosed herein. System 100 includes server 103, mobile device 105, mobile device 106, mobile device 107, mobile device 108, and mobile device 109 that may be communicatively connected via network 101. Each device in system 100 may be communicatively connected with each other, such as mobile device 108 communicatively connected with mobile device 106, mobile device 107, mobile device 109, or server 103 via network 101, via peer-to-peer communication (e.g., connection 112), or through another device, such as connect with mobile device 107 through connection 112 and connection 111 or connection with server 103 via connection 112, connection 111, connection 110, and network 101. Server 103 or the other apparatuses (e.g., devices) of FIG. 1 may be used to detect events, obtain alerts, send alerts, create contact groups (e.g., emergency related list of contacts that is a subset of larger contacts), determine communities of interest, or send poll messages (e.g., interview or survey), among other things.

Figure 2:
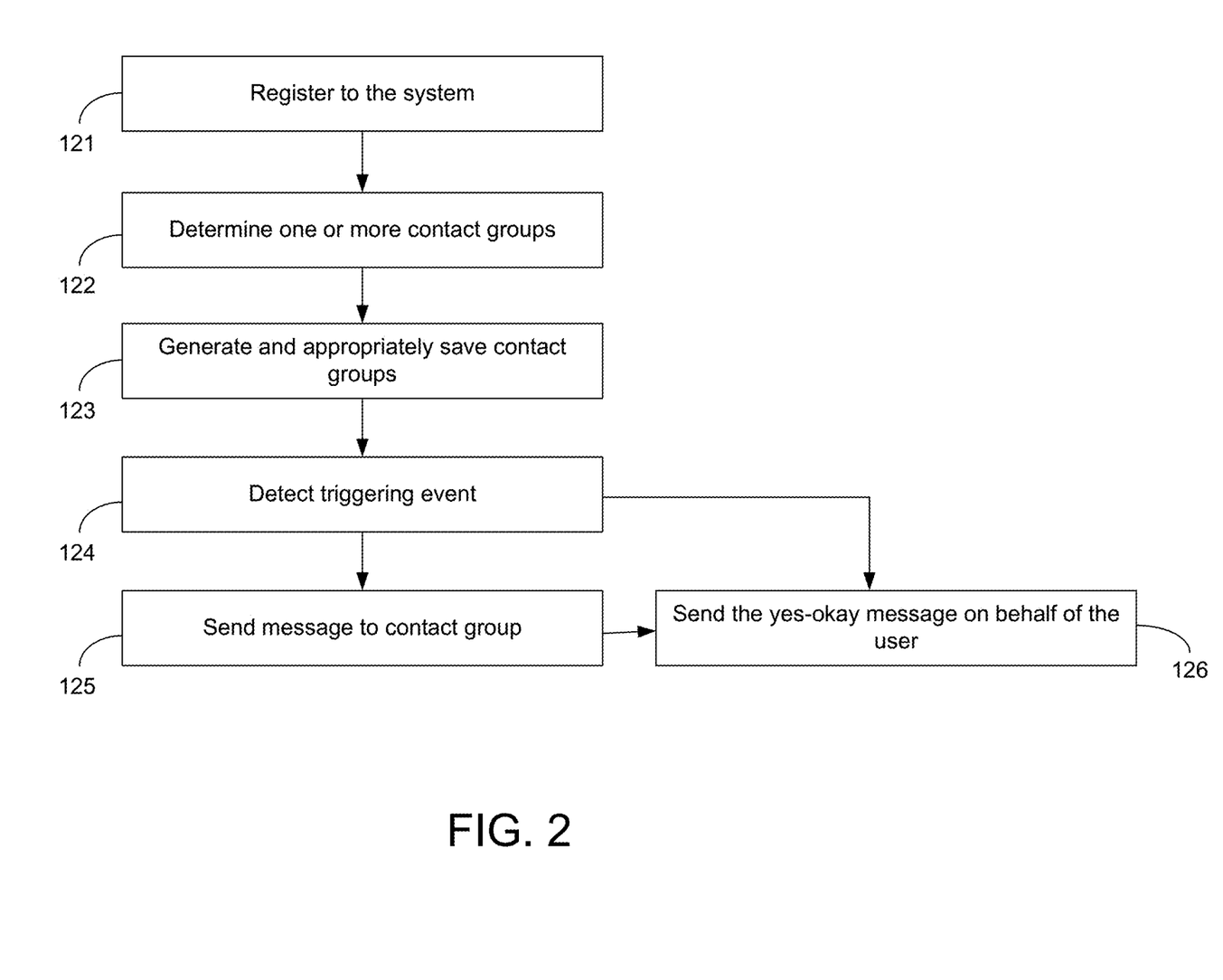
FIG. 2 illustrates an exemplary method for dynamic derivation or communication to a contact group.

FIG. 2 illustrates an exemplary method for dynamic derivation or communication to a contact group. At step 121, there may be a registration to the system for the dynamic derivation or communication to a contact group (hereinafter "dynamic contact derivation system" for short). A user (e.g., a user profile associated with a user which may be a particular mobile device 108 or plurality of devices) may have an associated device opted-in, provide self-information, list of contacts (phone number, digital (e.g., email, social media URL), etc.), prioritization preferences (e.g., for emergency, for contacting of contacts, for general okay, etc.), or other information. Prioritization and creation of contacts or contact group (disclosed in more detail herein) may be based on a list of contacts on mobile device 108, server 103, e-mail accounts, or social media, among other things. The contacts may be associated with a user profile of a particular mobile device 105 or multiple devices. The dynamic contact derivation system may have parts turned on or off based on user preference (e.g., user may only want to turn the system on while hiking). In another example, the feature for dynamic creation of a contact group may be active, but the feature for detection of an event or sending an alert communication may be turned off for selected periods (e.g., off during bedtime hours of a particular day).

At step 122, there may be a determination of one or more contact groups (e.g., communities of interest) based on activity associated with a device of a user (e.g., mobile device 108) and other information. For example, server 103 may monitor recent (e.g., 1 week or 1 month) activity. Activity may include location of a device associated with a first end user or a remote end user (e.g., during a phone call between mobile device 108 and mobile device 105, or the like communication), frequency of inbound or outbound communication (e.g., phone calls, e-mails, SMS texts, or social media) between contacts, which may be associated with one or more devices. Other information may include whether the contact is already saved in a list of contacts of a device of the user or social media account of the user, whether a threshold level (e.g., individual amount or percentage) of communication, proximity of contacts (e.g., current location or location of last communication), elapsed time since last communication between a user account and another account, or type of device of user or remote communicator to user, among other things. In an example, the frequency of inbound communications (e.g., two or more times) by a first user within a period of an emergency may trigger that the first user may be added to the contact group for subsequent yes-okay messages.

It is contemplated that a user over a period (e.g., a day) may communicate from multiple devices, such as laptop, mobile phone, or desktop among other things, which may be taken into account when creating the one or more contact groups. There may be multiple contact groups that determined for different events, locations, or activities, among other things (e.g., triggering event of step 124). For example, there may be a first emergency contact group for hiking (e.g., nearby hikers, park rangers), there may be a second emergency contact group for a vacation in the Caribbean, and there may be a third contact group for locations within 20 miles (for example) of a user's home. The system may be informed by social medial that certain contacts are hikers, for example, that and location, or other information, may weight towards including certain hikers into the "hiking" contact group. It is contemplated that a contact group would likely not be more than 75% of all the contacts of the user of mobile device 108, but it generally may be under 10% of all the contacts of the user of mobile device 108.

Figure 4:
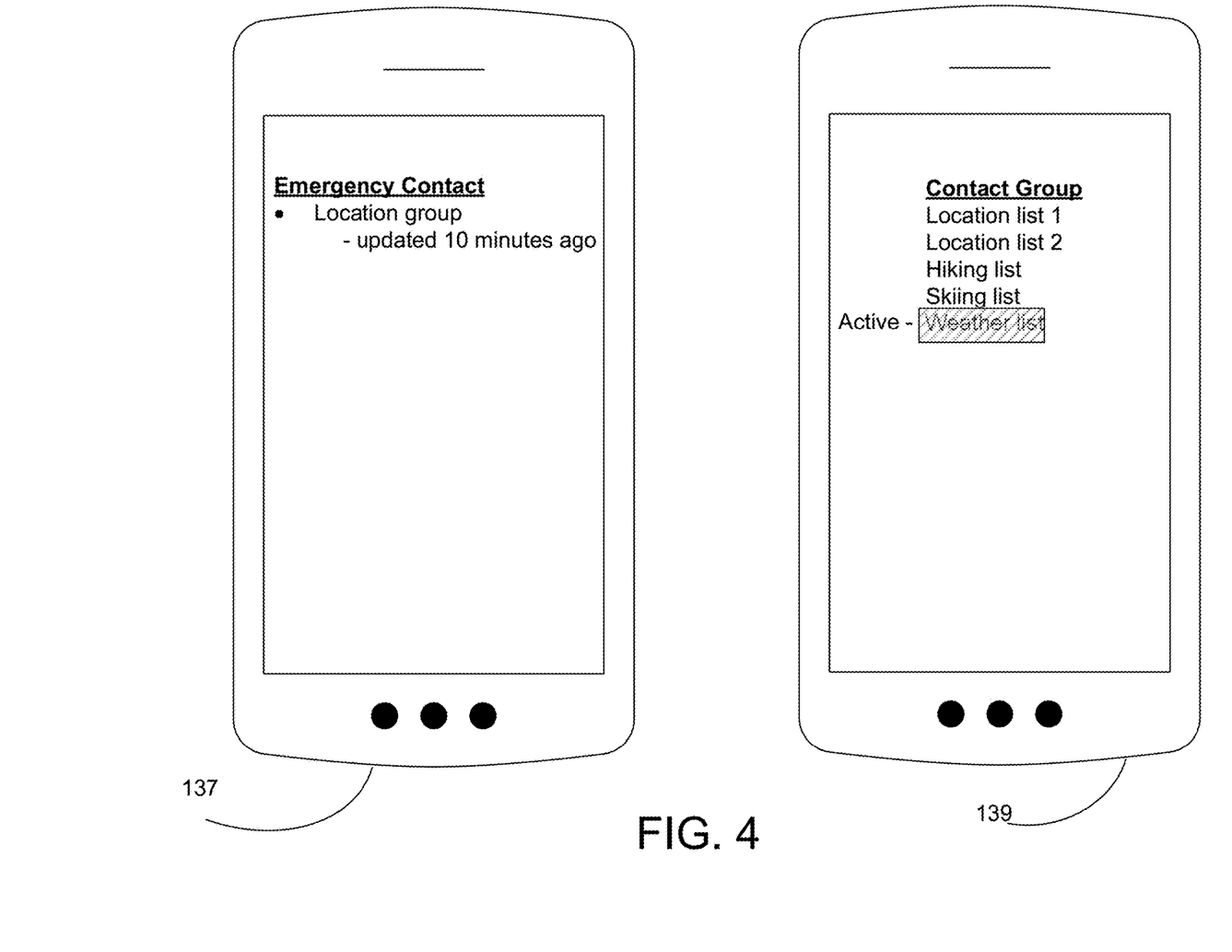
FIG. 4 illustrates an exemplary setup for a contact group.

With continued reference to FIG. 2, at step 123, the determined contact groups of step 122 may be generated and saved on the mobile device 108, server 103, or another device. The contact groups may have centralized management (e.g., server 103) or have distributed management (e.g., mobile device 108, mobile device 105, and server 103). At step 124, a triggering event may be detected. A triggering event may be based on information, such as news, social media information, weather, a geographical location, elapsed time period, pattern of communication (or lack thereof), pattern of unusual activity, or sensor information (e.g., camera, motion detector, altimeter, gyroscope, or accelerometer information that indicate steps or other patterns of movement), among other things. For example, one news-based triggering event may be the announcement of a high number of aggressive bears spotted in a particular location that is proximal to the user. In another example, social media information, as a directed message to a user, "look out for scouts from unit 43 as they have been known to spook others with ghost sounds", or general broadcast messages, "civil unrest has caused power outages throughout El Salvador" may trigger the system to initiate emergency contact methods. In an example, a triggering event is detected by a fixed set of rules. In another example, one or more machine-learned models detect the triggering event. These machine-learned models may adapt over time based on the frequency of a detected event, the efficacy of certain contact types in responding to a detected event, and the nature of the event itself (e.g. weather, social, injury, etc.). For the various examples herein, the machine-learned models may be adapted by comparing decisions made and historical outcomes of those decisions such that a more accurate alignment of the two can be achieved.

At step 125, based on detecting the triggering event of step 124, sending a message to a contact group (e.g., step 122 and step 123) associated with the user of mobile device 108 or mobile device 108. As disclosed herein the contact group may be based on the type of event (e.g., emergency), activity, or other information. The event may be determined by a combination of things. For example, hiking or skiing may be determined based on a location, description of location, geographical markers associated with the location, or history of previous comments by a user or other users of one or more mobile devices, among other things.

The sent message of this step 125 may be a message to poll the contact group (or the user of mobile device 108) with regard to the whereabouts of the user associated with mobile device 108, for example. The poll may be a message that helps determine the welfare of the user associated with mobile device 108. For example, mobile device 105, mobile device 106, mobile device 107, and mobile device 109 may receive a poll that asks whether the user of mobile device 108 has been seen within a time period (e.g., 2 minutes or currently). If a certain threshold percentage of the responses are returned with an acceptable response (e.g., 25% said "yes" to currently seen) then an emergency alert to authorities may be suspended for prescribed period (e.g., 2 hours). If a certain threshold percentage of the responses are returned with an unacceptable response (e.g., 100% said "no" to currently seen), then an emergency alert may be sent and authorities may be provided the responses of the contact group to the poll. This may expedite any investigation by authorities and help quickly resolve the emergency issue (particularly if the answered poll gives a hint on last geographic location the user of mobile device 108 was seen). Alternatively, the message of this step 125 may be a yes-okay message, as disclosed in more detail herein. The yes-okay message may indicate to the contact group that the user of mobile device 108 is safe during a weather event or the like. In another example, user could pre-specify a "timeout message" where after an elapsed time, the system may send a message to the contact group if user of mobile device 108 has not "checked-in" or acknowledged a system prompt. Depending on the type of event (e.g. a flood or long-term weather or other event), the system may trigger a recurring message (hourly, daily, etc.).

With continued reference to step 125, the message may be a yes-okay type message, which may be proactively initiated by the user of mobile device 108. The yes-okay message may include a short code that may describe the event and actions to be taken (e.g., hurt, okay, light injury, contact relatives, neighbors, etc.). Short codes sent within an area (e.g., proximate to mobile device 108) may receive network prioritization over traditional voice or text messages. Alternatively, the dynamic contact derivation system in step 123 or step 124 may have a triggering event associated with information such as mobile device 108 communicating with an emergency network (e.g., 911 or public safety), communicating with neighbors, browsing flood predictions zones, or the like emergency-related text or themes). Based on these triggering events (emergency-related themes), server 103 (or mobile device 108) may provide instructions to send a message on mobile device 108 to determine whether a particular contact group (e.g., family using an out-of-band interaction that doesn't require a full session) should be contacted.

At step 126, information, such as biometrics measurements (e.g., from finger print sensor or from activity tracker), motion information, authentication information, or the like, may serve as a trigger to automatically send the yes-okay message on behalf of the user of mobile device 108 to the contact group. Connected services (e.g. television, satellite, phone, home security) may act on behalf of or in coordination with system to confirm user of mobile device 108 is okay.

When sending the yes-okay message, resource utilization should be minimized by diverting traffic that usually travels over traditional voice networks to lower-bandwidth signaling networks. The dynamic contact derivation system may reduce congestion by aggregating responses within server 103 that can be distributed in a targeted way instead of using an area broadcast. The dynamic contact derivation system may aggregate observed activity (e.g., messages of step 125 and step 126) and forward insights to other civic authorities. Determining whether to use the dynamic contact derivation system (or the use of or generation of a contact group) may be based on reaching a threshold number of users (e.g., mobile devices) in proximity of mobile device 108 or threshold number of users (e.g., mobile devices) in proximity of contacts of the user of mobile device 108. For mobile device 108, if it is anticipated that many users near mobile device 108 may use wireless service (causing congestion), the dynamic contact derivation system may be used. In another example, in creating a contact group, contacts may be chosen based on their perceived influence (e.g., number of social media followers) or proximity to other contacts of mobile device 108 (e.g., family members living in same house or at same event may reduce or increase the priority to be selected in contact group or using contact group).

In an exemplary scenario, during a hiking trip, the user of mobile device 108 may have fallen into a ravine and been injured in an area that is sparsely populated. Activity indications such as, battery power of mobile device 108 (e.g., 5% power), geographic location (e.g., the ravine, or a sparsely populated area, or heavily wooded area), anticipated lack of wireless connectivity (e.g., cellular dead zone or intermittent coverage), or combination thereof of information may be triggering event(s) that cause instructions to be provided to broadcast or otherwise send alert to contact group. In addition, dynamic contact derivation system may proactively activate mesh networking in the affected area in expectation of outage of cellular service. For example, this mesh networking may automatically turn on for mobile devices indicated as hiking in a particular area.

Figure 3A:
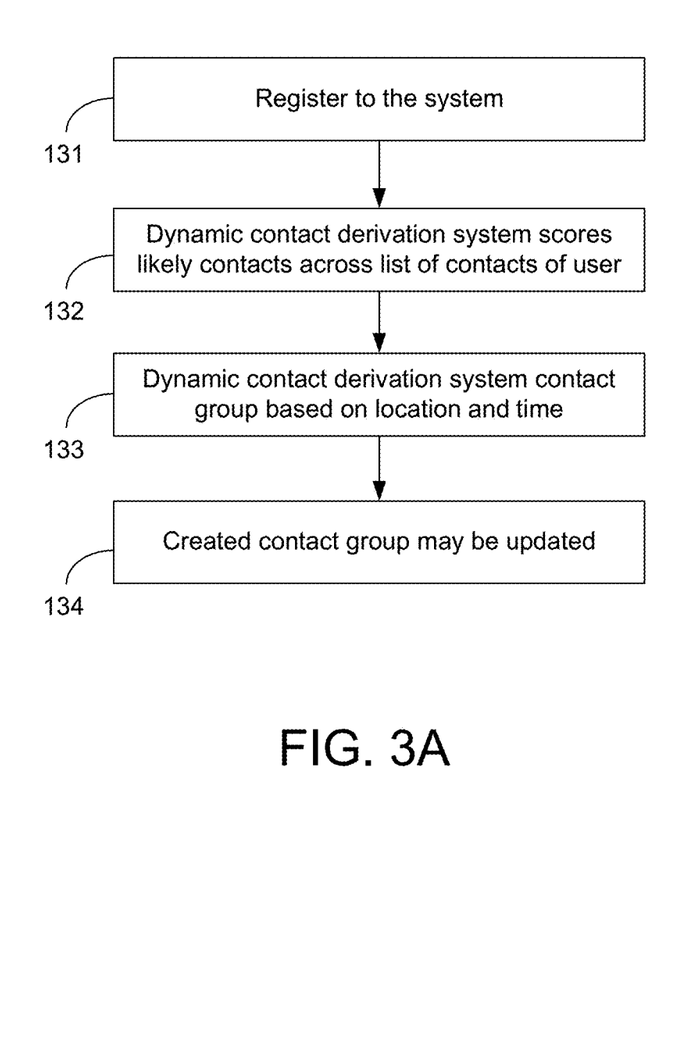
FIG. 3A illustrates an exemplary portion of the method flow of the creation of the contact group.
Figure 3B:
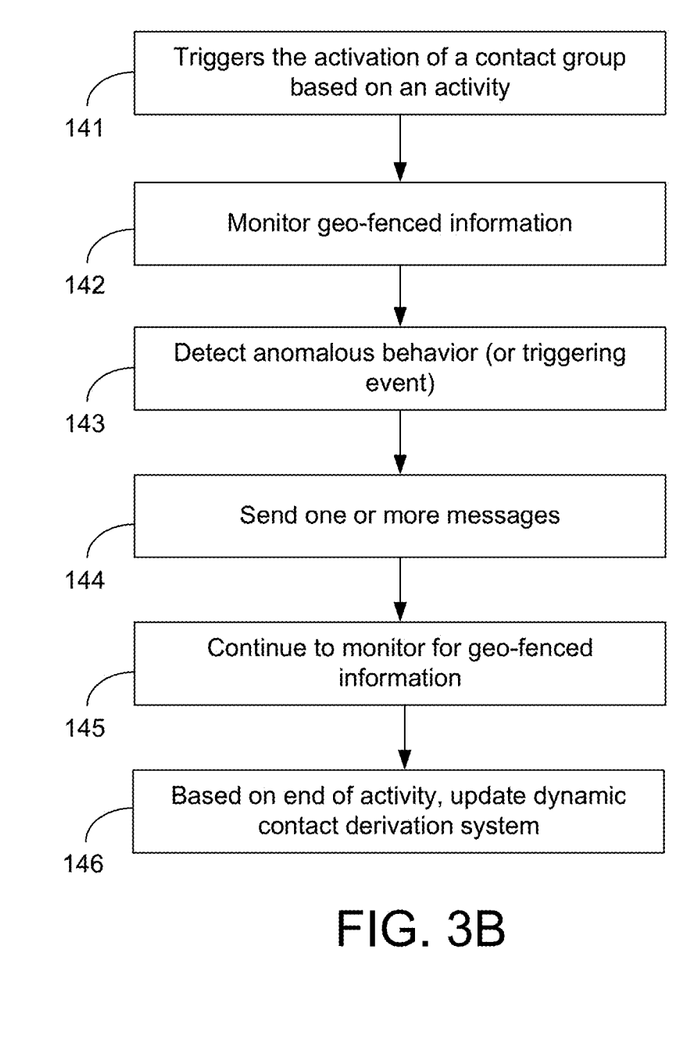
FIG. 3B illustrates an exemplary portion of the method flow of the use of the contact group.

FIG. 3A and FIG. 3B illustrate an exemplary method flow of the dynamic contact derivation system. FIG. 3A illustrates an exemplary portion of the method flow of the creation of the contact group. At step 131, a user registers with service for new activity. At step 132, dynamic contact derivation system scores likely contacts across list of contacts of user (e.g., stored on social media, cloud stored contacts, mobile device stored contacts, etc.). In an example, the scoring method may be fixed and may use a set of rules based on social contact frequency, information in a personal address book, or other information. In another example, the scoring method may be based on a model that is machine-learned from prior uses of the dynamic contact derivation system. For instance, a machine-learned model may be initialized with the fixed scoring method described above. However, a particular user registered to the system that begins to exhibit more dangerous behavior (e.g., cliff jumping, free climbing, wingsuit skydiving) may have emergency contact networks that are activated after failed yes-okay message attempts much more quickly. Here, the machine-learned model may adapt to the number of frequency of emergency alert, the location of the user, the behavior (e.g., biometrics) of the user to produce different scoring distributions. Alternatively, a machine-learned model for contact scoring may be customized based on location and event like hiking in the wilderness, kayaking on whitewater rivers, or walking alone at night in foreign, urban cities. The aforementioned adaptation process may produce a plurality of machine-learned scoring models, whereas the scoring methods ultimately combine to form a single contact score, or emergency response messaging or networking which may be used after step 132.

At step 133, dynamic contact derivation system based on location and time (or other information), determines contact group that is to be created (or otherwise selected). Whether a contact is included in the created contact group may be based on the scores of step 132. It is contemplated herein that a contact may opt-out of being included in another's contact group. To simplify the example, location and time is used, but other information (e.g., information of step 122 and throughout) may be a trigger to create a new contact group (e.g., regular emergency contacts, hiking emergency contacts, or location-based emergency contacts, etc.). As disclosed herein, the created contact group may be used as a tool to inform public safety (e.g., polling discussed herein), to automatically and efficiently contact a group to inform that all is well (or not) with a user (this may also be used by public safety during emergencies involving the user), or the like. At step 134, the newly created contact group may be updated on server 103 or mobile device 108. The update may be as simple as changing the primary list used of multiple predetermined contact group (e.g., weather list as shown in block 139 of FIG. 4), having one list that is periodically updated (e.g., block 137 of FIG. 4), or some combination of active predetermined contact group and updates of the predetermined contact group.

FIG. 3B illustrates an exemplary portion of the method flow of the use of the contact group. At step 141, a user (e.g., user associated with mobile device 108) triggers the activation of a contact group based on an activity (e.g., hiking). At step 142, based on the activation the dynamic contact derivation system monitors geo-fenced information (e.g., news information about criminal activity or road work, social media information from news feeds, weather alert, etc.). The geo-fenced information may be prioritized or weighted and a combination of the information may need to be a certain threshold score before becoming a triggering event.

At step 143, the dynamic contact derivation system may detect a user behavior that is an anomaly (or other triggering event). At step 144, based on the detection of the anomaly (or other triggering event) of step 143, one or more messages may be sent. In one scenario, a polling message may be sent to the user to determine if everything is okay. In a second scenario, a polling message may be sent to the contact group to determine if everything is okay with regard to the user. In a third scenario, there may be an automatic detection based on information (e.g., sensors or communication activity such as normal texting activity) that user is okay (or not). Note that based on this automatic detection a user's social media profile may be updated to show status (e.g., a blue "not able to determine," green "okay", yellow "danger", and red "emergency—contact authorities"). It is also, contemplated that this list may be used for non-emergencies. For example, a social media profile may be automatically updated (or other communication) to show changing locations of the user on a map, people met by the user along the way, or other information to the hiking contact group. At step 145, the dynamic contact derivation system may continue to monitor the geo-fenced information for anomalies (or other triggering event) until the activity is concluded. At step 146, after the activity is concluded (or during the activity) the dynamic contact derivation system updates anomaly detection model, updates group activity formulation model, or updates contact group based on the information gathered during the activity.

Disclosed herein is a system for automatically creating and maintaining a contact group and sending messages associated with the contact group. The creation and maintenance of the contact group may be for emergencies based on recent history (calling, contact, etc.). The creation and maintenance of the contact group may be based on co-occurring activities or location proximal interactions for emergency situations. There may be a central service for broadcast of an "okay" message in bulk to the contact group. There may be a use of short code (e.g., numeric or alphanumeric) to reduce resource utilization in emergency situations but reach many people simultaneously. The disclosed system allows for the ability to proactively reach out to users to solicit an "okay" response in emergency conditions. Biometric monitoring, via a sensor, of users may trigger okay or emergency responses as disclosed herein. Biometric identifiers may be considered the distinctive, measurable characteristics used to label and describe individuals. Biometric identifiers may often be categorized as physiological and behavioral characteristics. Physiological characteristics may be related to the shape of the body. Examples include, but are not limited to fingerprint, palm veins, face recognition, DNA, palm print, hand geometry, iris recognition, retina, or odor/scent. Behavioral characteristics may be related to the pattern of behavior of a person, including but not limited to typing rhythm (e.g., desktop computer typing rhythm or mobile phone texting rhythm), gait (e.g., manner of walking or running), or voice. One or more of these sensed biometrics may be used as the information herein to trigger for emergency messages, determining groups, or the like.

Use of other sensors (e.g., camera, motion, etc.) may complement and confirm service-based detection of emergency conditions for specific individuals in an emergency (e.g., auto determine if individuals were affected by an earthquake). The disclosed system may be used for different types of events that occur not just for users but also automated devices (e.g., Internet of Things device or unmanned vehicle), such as in crowded areas (e.g., answering requests from a stadium for a lost child, confirming attendance at a busy technical or sporting conference, repairing a device). The system may assist in improving artificial intelligence for understanding of an emergency condition (e.g., user stopped moving or talking in mid-run or athletic activity, car crash detected by interrupted data signal, etc.) and automatically initiating aspects of the dynamic contact derivation system for the user.

Without in any way unduly limiting the scope, interpretation, or application of the claims appearing herein, a technical effect of one or more of the examples disclosed herein may be to allow for resource utilization to be minimized by diverting traffic that go over traditional voice networks in lower-bandwidth (and broadcast mode) (SMS vs voice). Broadcast or multicast mode reduces congestion by aggregating responses within the internet service provider (e.g., a central server) that may distribute the message instead of within area broadcast. Dynamically formulated contact groups may alleviate the burden of creating lists (e.g., emergency contact lists) from people undergoing the stress of an emergency situation; the system may keep the contact groups up-to-date in the background and be ready to go when the emergency happens. Intelligent rebroadcast of a yes-ok type message may include civic institutions, emergency medical services, and recovery entities. Proactive solicitation of yes-ok request also alleviates burden of those under the stress of an emergency situation.

Figure 5:
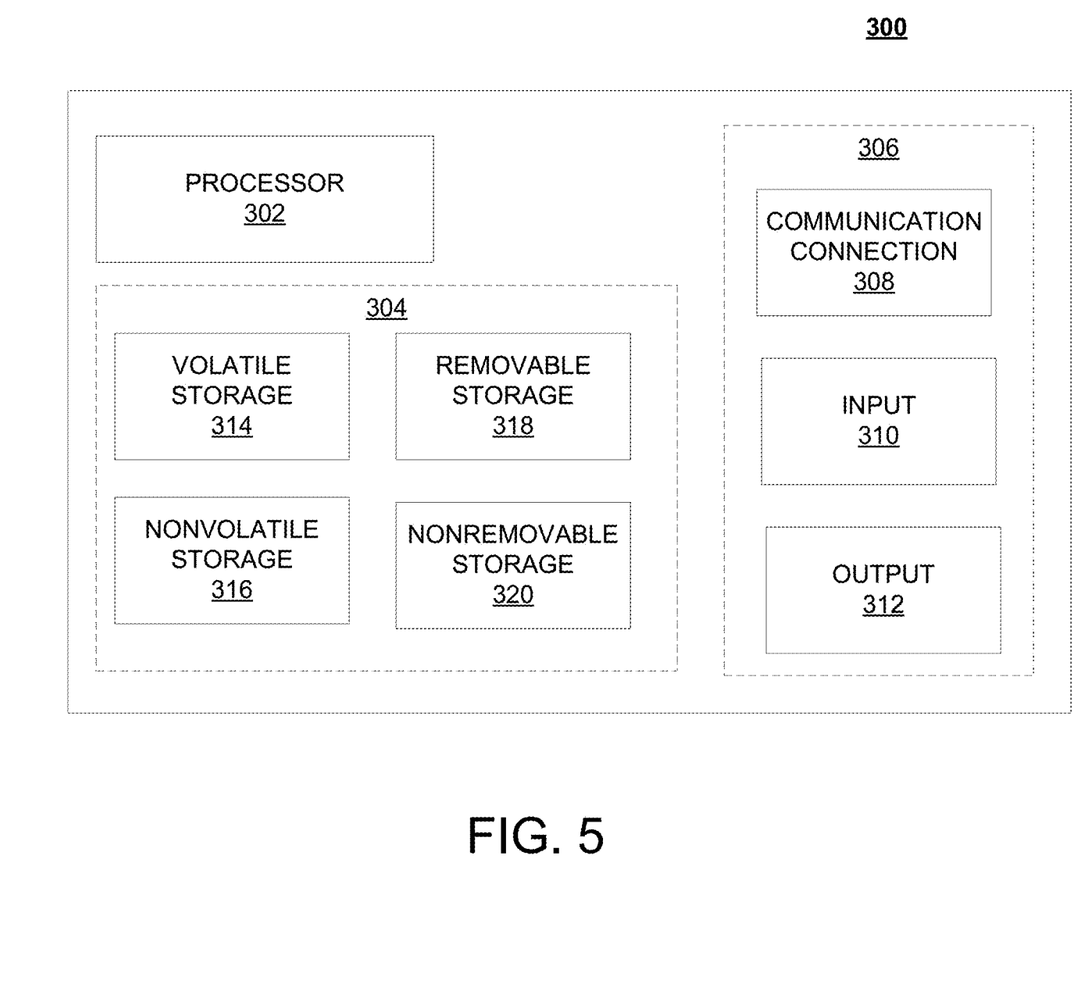
FIG. 5 illustrates a schematic of an exemplary network device.

FIG. 5 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300 depicted in FIG. 5 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 5 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 5) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 6:
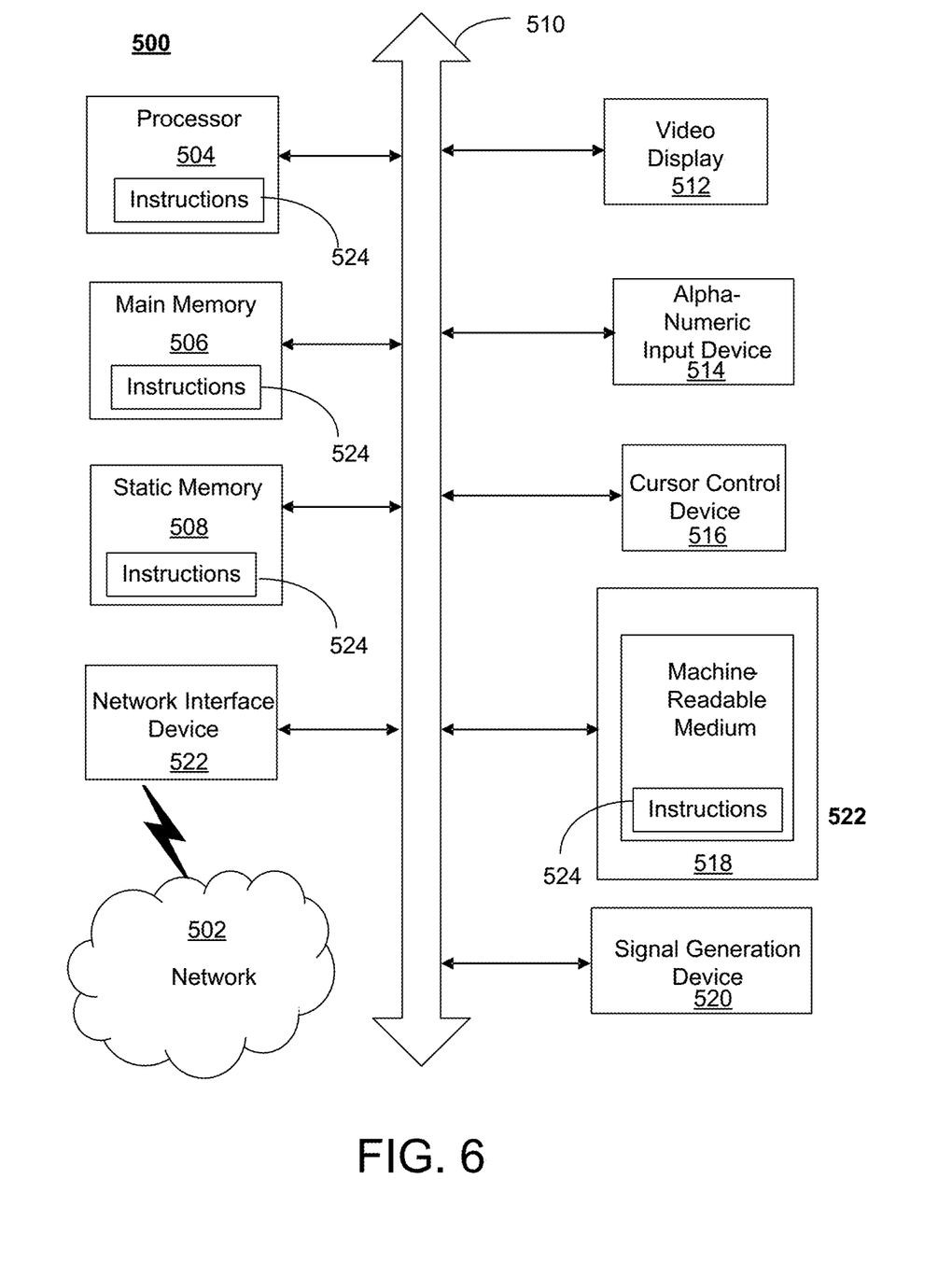
FIG. 6 illustrates an exemplary communication system that provides wireless telecommunication services over wireless communication networks.

FIG. 6 depicts an exemplary diagrammatic representation of a machine in the form of a computer system 500 within which a set of instructions, when executed, may cause the machine to perform any one or more of the methods described above. One or more instances of the machine can operate, for example, as processor 302, mobile device 105, mobile device 106, mobile device 107, mobile device 108, server 103, other devices of FIG. 1 and FIG. 7. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 7:
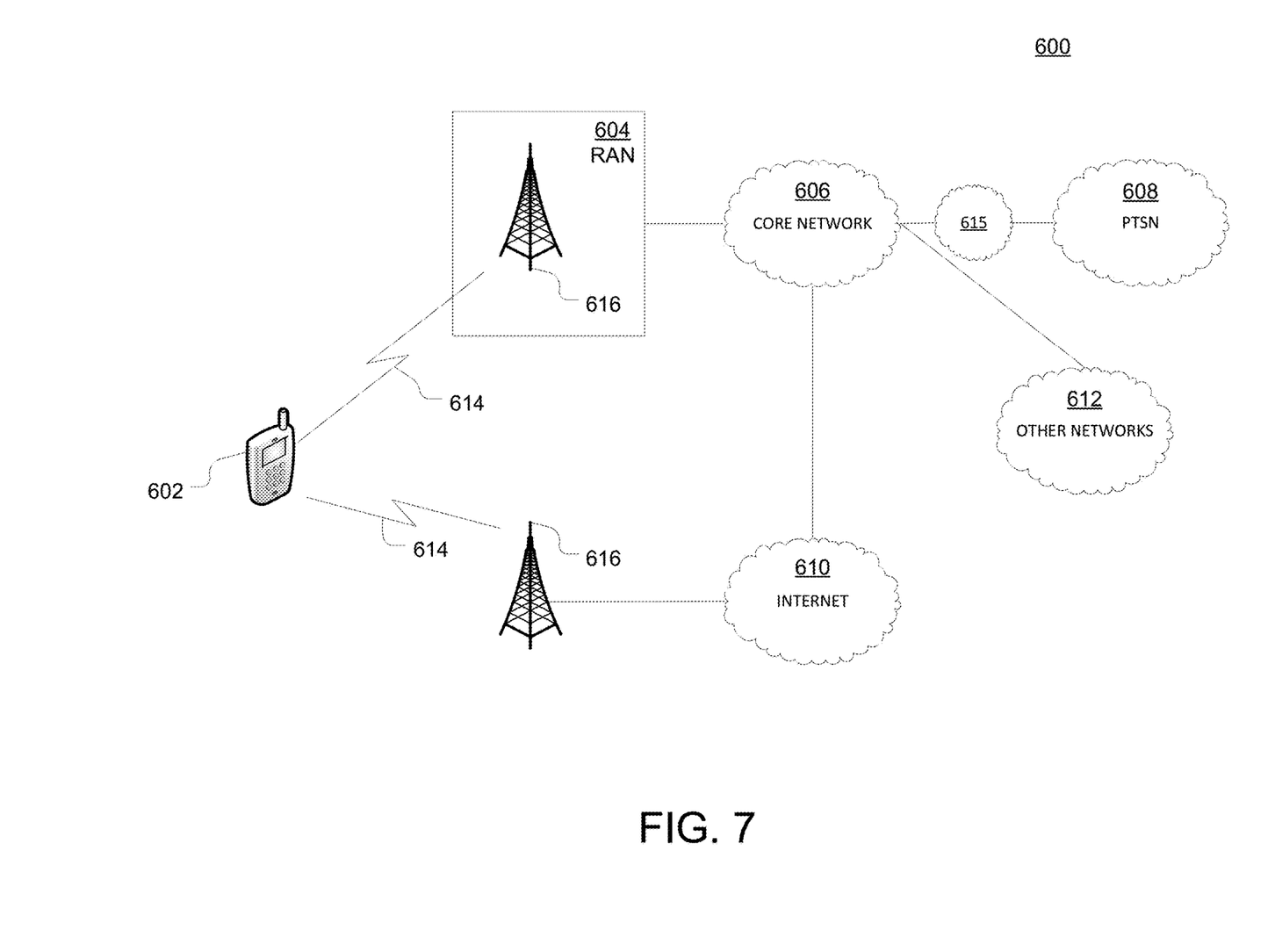
FIG. 7 illustrates an exemplary telecommunications system in which the disclosed methods and processes may be implemented.

As shown in FIG. 7, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise mobile device 108, an unmanned vehicle, network device 300, or the like, or any combination thereof. By way of example, WTRUs 602 may be configured to transmit or receive wireless signals and may include a UE, a mobile station, a fixed or mobile subscriber unit, a pager, a cellular telephone, a PDA, a smartphone, a laptop, a netbook, a personal computer, a wireless sensor, consumer electronics, or the like. It is understood that the exemplary devices above may overlap in their functionality and the terms are not necessarily mutually exclusive. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 7, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 7, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 615 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which dynamic contact derivation system messages can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—dynamic contact derivation system—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed invention, including making and using any devices or systems and performing any incorporated methods. The patentable scope of the invention is defined by the claims, and may include other examples that occur to those skilled in the art. For example, skipping steps, combining steps, or adding steps between exemplary methods disclosed herein (e.g., steps of FIG. 2, FIG. 3A, or FIG. 3B). The steps associated with the dynamic contact derivation system may be located on a singular apparatus, such as mobile device 108 or server 103, or distributed across apparatuses in a network. Such other examples are intended to be within the scope of the claims if they have structural elements that do not differ from the literal language of the claims, or if they include equivalent structural elements with insubstantial differences from the literal languages of the claims.

An apparatus, a system, a method, a computer readable storage medium may provide for dynamic derivation of a contact group. The steps for dynamic derivation of a contact group may include obtaining first information associated with a user of a mobile device, the first information comprising a geographic location of the mobile device; based on the first information and second information, generating a contact group, wherein the contact group comprises a list of contact information of a subset of contacts of the user and wherein the second information comprises geographic location of contacts of the user; detecting an event; and based on the detected event, sending a message to the contact group. The first information may be a trigger to start the generation of a contact group. The second information may be used to determine which contacts to include in the contact group. The geographic location of the user may be based on mobile device that is worn or otherwise usually kept with the user. The user may be associated with a mobile device based on a login/password, facial recognition, or other manner of association with the device.

What is claimed:

1. An apparatus comprising:
a processor; and
a memory coupled with the processor, the memory comprising executable instructions that when executed by the processor cause the processor to effectuate operations comprising:
    obtaining first information associated with a user of a mobile device, the first information comprising a geographic location of the mobile device;
    obtaining second information, wherein the second information comprises geographic location information for contacts associated with the mobile device and information for one or more triggering events associated with the user;
    detecting a triggering event of the one or more triggering events;
    determining a triggering event type for the detected triggering event;
    in response to the triggering event type for the detected triggering event, the first information, and the second information, generating a contact group from a list of contacts associated with the mobile device using the triggering event type, the first information, and the second information, wherein the contact group is a subset of contacts of the list of contacts; and
    sending a message to the contact group, wherein the message to the contact group is a message regarding whereabouts of the user associated with the mobile device or a yes-okay message.

2. The apparatus of claim 1, wherein the first information comprises a time.

3. The apparatus of claim 1, wherein the first information comprises a weather alert.

4. The apparatus of claim 1, wherein the first information comprises a percentage of outbound communication by the mobile device.

5. The apparatus of claim 1, wherein the second information comprises number of communications from the contacts to the mobile device.

6. The apparatus of claim 1, wherein the apparatus is a server, the mobile device, or another mobile device.

7. A tangible computer readable storage medium storing computer executable instructions that when executed by a computing device cause said computing device to effectuate operations comprising:
    obtaining first information associated with a user of a mobile device, the first information comprising a geographic location of the mobile device;
    obtaining second information, wherein the second information comprises geographic location information for contacts associated with the mobile device and information for one or more triggering events associated with the user;
    detecting a triggering event of the one or more triggering events;
    determining a triggering event type for the detected triggering event
    in response to the triggering event type for the detected triggering event, the first information, and the second information, generating a contact group from a list of contacts associated with the mobile device using the triggering event type, the first information, and the second information, wherein the contact group is a subset of contacts of the list of contacts; and
    sending a message to the contact group, wherein the message to the contact group is a message regarding whereabouts of the user associated with the mobile device or a yes-okay message.

8. The computer readable storage medium of claim 7, wherein the first information comprises a weather alert.

9. The computer readable storage medium of claim 7, wherein the first information comprises a percentage of outbound communication by the mobile device.

10. The computer readable storage medium of claim 7, wherein the second information comprises number of communications from the contacts to the mobile device.

11. A system comprising
a mobile device; and
an apparatus comprising:
    a processor; and
    a memory coupled with the processor, the memory comprising executable instructions that when executed by the processor cause the processor to effectuate operations comprising:
        obtaining first information associated with a user of a mobile device, the first information comprising a geographic location of the mobile device;
        obtaining second information, wherein the second information comprises geographic location information for contacts associated with the mobile device and information for one or more triggering events associated with the user;
        detecting a triggering event of the one or more triggering events;
        determining a triggering event type for the detected triggering event;
        in response to the triggering event type for the detected triggering event, the first information, and the second information, generating a contact group from a list of contacts associated with the mobile device using the triggering event type, the first information, and the second information, wherein the contact group is a subset of contacts of the list of contacts; and
        sending a message to the contact group, wherein the message to the contact group is a message regarding whereabouts of the user associated with the mobile device or a yes-okay message.

12. The system of claim 11, wherein the first information comprises a weather alert.

13. The system of claim 11, wherein the first information comprises a percentage of outbound communication by the mobile device.

14. The system of claim 11, wherein the second information comprises number of communications from the contacts to the mobile device.

15. The system of claim 11, wherein the triggering event comprises at least one of: news information, social media information, weather, a geographical location, an elapsed time period, a pattern of communication, a lack of a pattern of communication, a pattern of unusual activity, or sensor information.

16. The system of claim 11, the operations further comprising monitoring geo-fenced information within a predetermined location of the mobile device and determining an occurrence of a triggering event when the geo-fenced information exceeds a predetermined threshold.

17. The system of claim 11, wherein the message is sent repeatedly according to a predetermined schedule.

18. The system of claim 11, wherein the yes-okay message is sent based on biometric information associated with the user or authentication information generated by the user.

* * * * *

UNITED STATES PATENT AND TRADEMARK OFFICE
CERTIFICATE OF CORRECTION

PATENT NO. : 10,715,987 B2
APPLICATION NO. : 16/145442
DATED : July 14, 2020
INVENTOR(S) : Eric Zavesky et al.

It is certified that error appears in the above-identified patent and that said Letters Patent is hereby corrected as shown below:

In the Claims

Claim 7, Column 16, Line 2, after "event" insert -- ; --.

Signed and Sealed this
Twenty-fourth Day of November, 2020

Andrei Iancu
*Director of the United States Patent and Trademark Office*